J. DRUMB.
WHEEL HUB.
APPLICATION FILED JUNE 9, 1920.
1,405,105.
Patented Jan. 31, 1922.
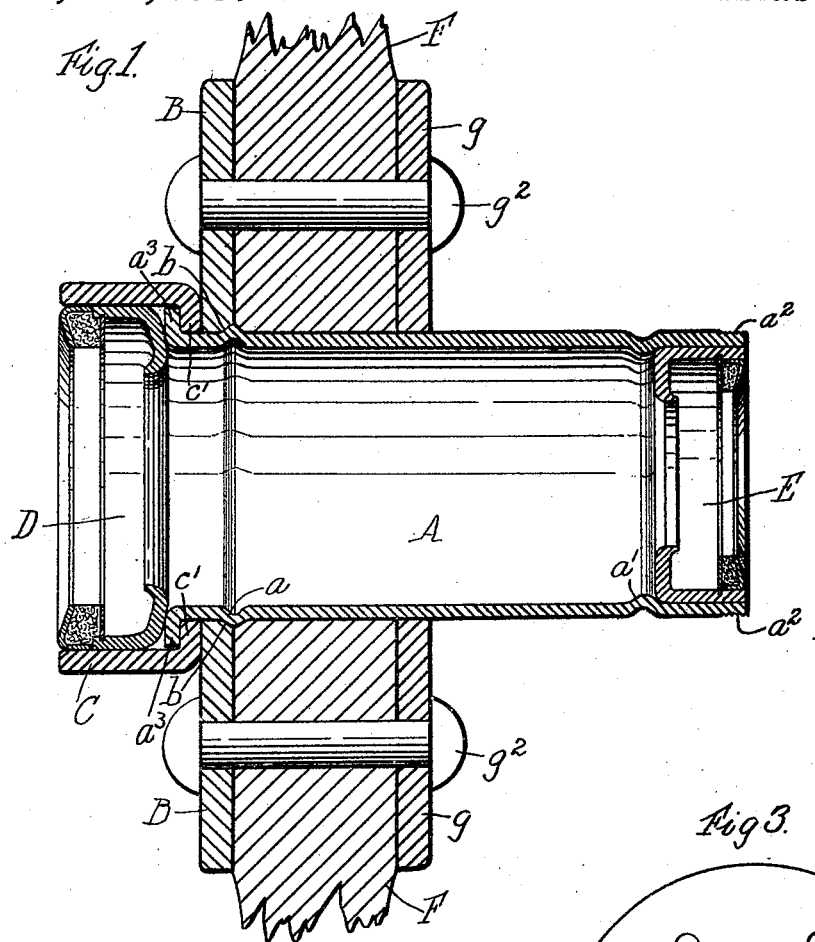
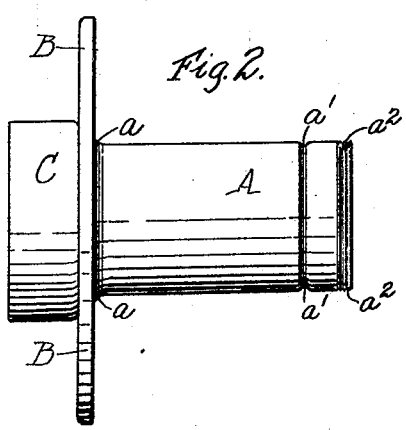
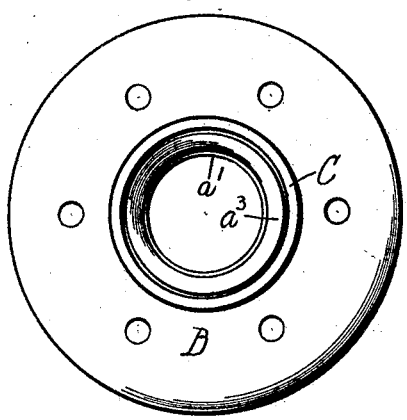
Inventor
John Drumb
By Parker & Prochnow.
Attorneys

UNITED STATES PATENT OFFICE.

JOHN DRUMB, OF BUFFALO, NEW YORK, ASSIGNOR TO McKINNON DASH COMPANY, OF BUFFALO, NEW YORK.

WHEEL HUB.

1,405,105.      Specification of Letters Patent.      Patented Jan. 31, 1922.

Application filed June 9, 1920. Serial No. 387,737.

*To all whom it may concern:*

Be it known that I, JOHN DRUMB, a citizen of the United States, residing at Buffalo, in the county of Erie and State of New York, have invented a new and useful Improvement in Wheel Hubs, of which the following is a specification.

This invention relates to hubs of the kind used on vehicle wheels.

The objects of this invention are to provide a wheel hub of this kind of improved and simplified construction which can be made of steel parts, thus replacing the malleable iron cast hubs heretofore used; also to improve the construction of hubs of this kind in other respects hereinafter specified.

In the accompanying drawings:

Fig. 1 is a fragmentary central sectional view of a vehicle wheel including a hub embodying the invention.

Fig. 2 is a side elevation of the hub, on a reduced scale.

Fig. 3 is an end elevation thereof.

The hub shown in the drawings is intended to replace the usual malleable iron hub now employed on Ford automobiles, but it will be understood that this invention can be used in connection with wheels of vehicles of any other kind. These malleable iron hubs generally include a cylindrical body portion having at opposite ends parts adapted to receive the bearings and also an integral flange to which the spokes of the wheel are secured, and these hubs are therefore more or less complicated to manufacture and frequently break.

The hub embodying the invention and which is shown in the drawings includes a cylindrical body portion A, which in the construction shown is made of a single piece of steel tubing, seamless tubing being preferably used, a flange member B, and a cup-shaped bearing member C, the flange and cup members being rigidly secured to the cylindrical body portion of the hub. The body portion A is provided adjacent to one end thereof with a stop which is preferably made integral therewith and which in the construction shown is in the form of a bead or annular offset portion $a$ which may be made by heating the steel tube and then forming the bead thereon. This bead forms a stop for positioning the hub flange B. At the other end of the body portion a bead $a'$ is formed which projects inwardly toward the interior of the body portion and forms an inner annular shoulder. The end of the body portion is threaded as shown at $a^2$ and is adapted to receive the usual hub cap (not shown) which covers the end of the axle and hub.

The hub flange B may be of any suitable or desired construction, that shown being in the form of an annular steel plate which may be stamped or otherwise formed. The flange is provided with a central perforation which enables the same to be inserted over the steel tube from which the hub A is formed, and the disk is preferably provided with an annular, bevelled, inner edge $b$ adapted to cooperate with the bead $a$ to securely wedge the disk on the end of the body portion of the hub.

The bearing cup C is preferably formed by stamping or pressing and has an outer, annular wall $c$ and an inwardly extending annular portion $c'$, the inner face of which is adapted to bear against the exterior of the body portion A. When the parts of the hub are assembled the flange portion B is first positioned over the end of the body portion A and placed against the stop bead $a$. The bearing cup C is then placed over the same end of the tube or body portion into engagement with the flange portion B. The end of the tube is then upset or turned outwardly, either by rolling or by any other means, as shown at $a^3$, so as to securely press the bearing cup C against the flange B and thereby also force the flange against the bead $a$.

The bearing cup C is made to receive a bearing D of any suitable kind and the turned-over portion $a^3$ of the tubular body of the hub forms a stop for the bearing D. At the opposite end of the hub a bearing E is provided which may be inserted into the steel tube or body portion of the hub and which bears against the bead $a'$. These two bearings are of the same construction heretofore used and of themselves constitute no part of this invention.

The parts of the wheel may be mounted on the hub in any suitable manner. In Fig. 1, F represents the spokes of a wheel which are held in place by the flange member B of the hub and by a corresponding flange $g$, the spokes and the flanges B and $g$ being connected by means of rivets or the like $g^2$.

The hub described is intended to replace the usual malleable iron hub now used and has the advantage of being stronger than the corresponding malleable iron hub and of being practically unbreakable. The hubs described are easily manufactured and can be made of steel tubing of standard size, so that very little machine work is necessary. The hub is so made that all of the parts of the wheel such as ball bearings, hub caps, spokes, etc., as heretofore used on malleable iron hubs, can be used without change on the hub described, for example, the hub shown in Fig. 1 is intended to replace the malleable iron hubs of the front wheels of a Ford automobile. Consequently the bearing cup C is so made as to receive the standard outer bearing member represented by E. The flange $g$ and the spokes F are also the same as now used on Ford wheels. By changing the size or proportions of the parts of the hub the same can be easily adapted for use in connection with parts of wheels other than those used with wheels on Ford cars.

The hub described has the advantage of being very strong and when the parts thereof are assembled as described, the parts of the hub are securely held together and since the parts of the hubs can be made of steel tubing and plates, they can be very easily manufactured.

I claim as my invention:

1. A hub for a vehicle wheel including a tubular body portion having an outwardly extending bead formed thereon, an annular member through which said body portion extends and which bears against said bead, said annular member forming a hub flange, a bearing cup having a hole through which said body portion extends, and turned-over end portions of said body portion securing said bearing cup and flange on said body portion.

2. A vehicle wheel hub including a body portion formed of steel tubing and having an outwardly extending integral portion adjacent to one end thereof, a hub flange member having a central opening through which said body portion extends and adapted to be pressed against said outwardly extending portion, said central opening being shaped to form a wedging engagement with said outwardly extending portion, and a turned-over integral end portion on said body portion for holding said flange member on said body portion.

Witness my hand this 4th day of June, 1920.

JOHN DRUMB.

Witnesses:
 EDITH I. SHONTS,
 W. D. WOTMAN.